1,587,597

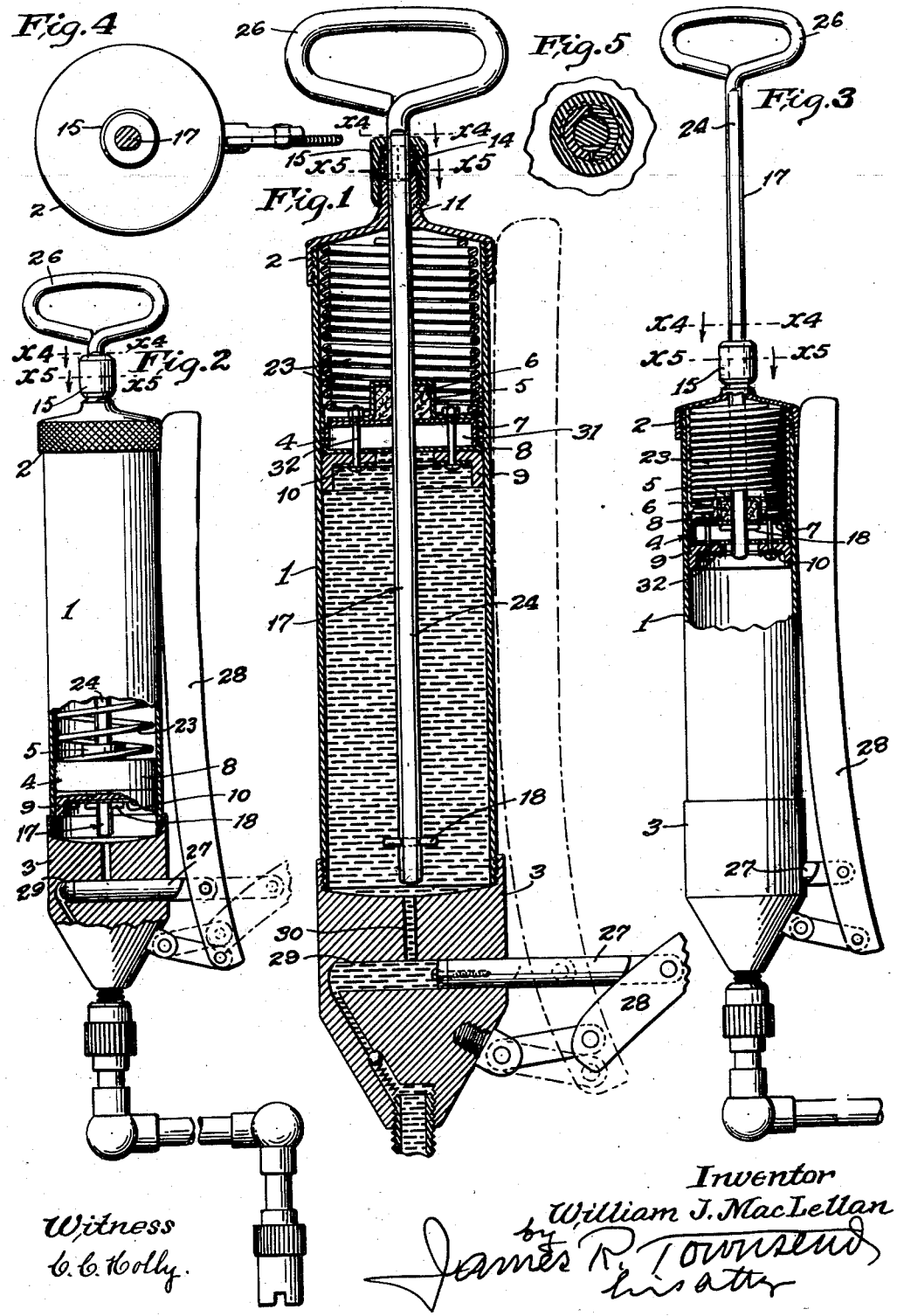
June 8, 1926.
W. J. MacLELLAN
GREASE GUN
Filed March 15, 1926
1,587,597
2 Sheets-Sheet 1
Inventor
William J. MacLellan June 8, 1926.  
W. J. MacLELLAN  
1,587,597  
GREASE GUN  
Filed March 15, 1926  2 Sheets-Sheet 2
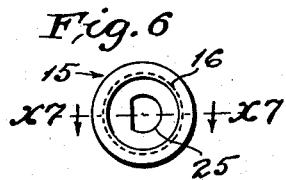
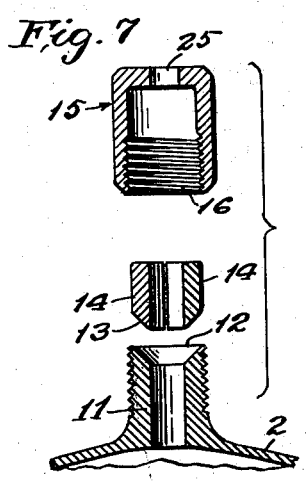
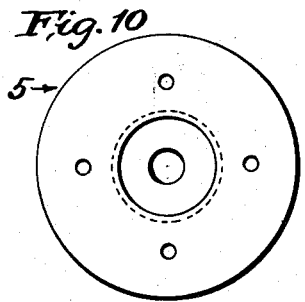
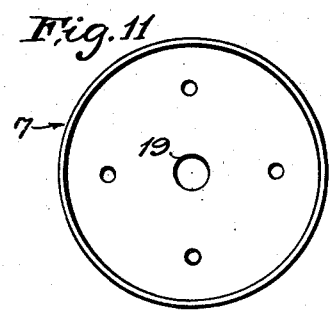
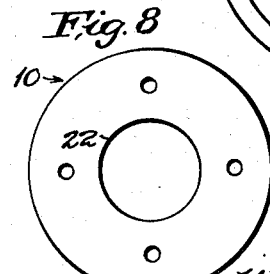
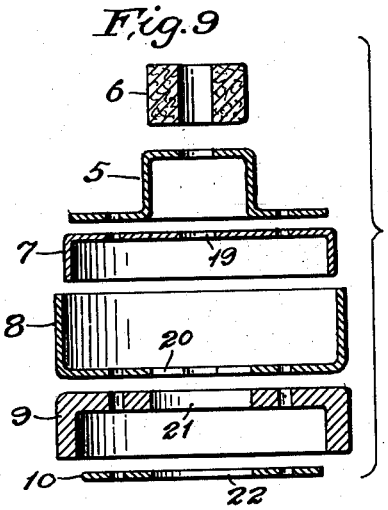
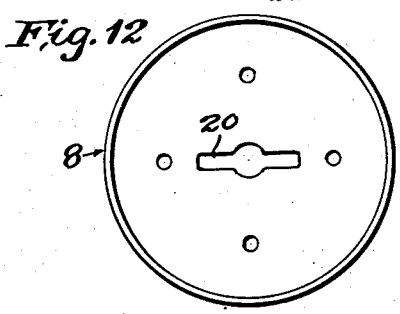
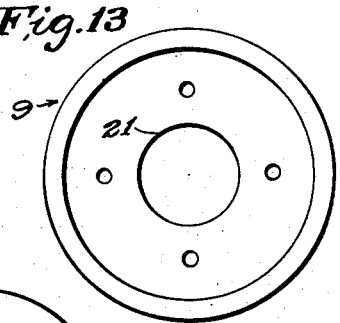
Witness  
C. C. Holly.
Inventor  
William J. MacLellan  
James R. Townsend  
his atty Patented June 8, 1926.

UNITED STATES PATENT OFFICE.

WILLIAM J. MacLELLAN, OF LONG BEACH, CALIFORNIA, ASSIGNOR OF ONE-FOURTH TO HIMSELF, ONE-FOURTH TO G. W. FOURNIER, ONE-FOURTH TO WILLIAM M. LAND, AND ONE-FOURTH TO JOSEPH H. ROGERS.

GREASE GUN.

Application filed March 15, 1926. Serial No. 94,819.

An object of this invention is to provide a simple, practical grease gun of the spring pressed piston type that is compact and that is alternatively operable automatically or by hand, that may be brought into collapsed condition for storage and transportation, and in which the piston can be locked at any point in the primary pump barrel.

The invention is applicable in different sizes for various uses; for forcing grease into bearings of automobiles and other machinery.

Another object is to provide novel means for locking and unlocking the piston rod relative to the pump barrel.

This invention relates to that class of grease guns having a container; a booster head detachably connected thereto and closing one end; a spring operated piston head in the container arranged to automatically force grease into the booster head. Such grease guns may be filled by removing the booster head and forcing the grease into the open end of the container while the spring operated piston head is retracted by means of a handle.

It is difficult to completely charge the container so that there will be no air pockets in the charge or in the container, which may interfere with the automatic discharge of grease from the container into the booster head; and an object of this invention is to eliminate this difficulty and insure the proper discharge of grease into the booster head.

The invention includes the parts and combinations of parts hereinafter more particularly described and claimed.

This invention is broadly new, basic and pioneer in that I employ a piston head, and a piston rod for operating the same, which rod is adapted to be attached to and detached from the piston head; and I also provide means whereby the piston rod may be detachably fixed to the container so that the piston rod may be unshipped from the piston head and mainly chambered in the container when it is desired to make the grease gun compact; and I also provide means whereby the piston rod may be held in fixed relation to the container and to the piston head when it is desired to hold the head from yielding to the pressure of the spring.

An object is to make provision whereby, through operation of the handle, the piston rod can be made to pick up the piston head and move it either forward or back and can, by like operation of the handle be again detached and collapsed.

Other objects, advantages and features of invention may appear from the accompanying drawings, the subjoined detailed description and the appended claims.

The accompanying drawings illustrate the invention.

Figure 1 is a fragmental longitudinal section of a grease gun constructed in accordance with this invention, with the parts in position for automatic action; the container and booster head being charged with grease. The position of the booster head lever when the booster head is closed is indicated in broken lines.

Fig. 2 is an elevation partly in section of the grease gun shown in Fig. 1 free from any charge with the booster head closed and the piston down.

Fig. 3 is an elevation partly in section showing the parts locked in position retracting the piston head.

Fig. 4 is a plan of Fig. 1 in section on line $x^4$, Figs. 1, 2 and 3.

Fig. 5 is an enlarged section on line $x^5$, Figs. 1, 2 and 3.

Fig. 6 is an enlarged end view of the lock stop nut detached.

Fig. 7 is a longitudinal section of the lock stop nut on line $x^7$, Fig. 6.

Fig. 8 is a plan view of the piston head end plate shown in section at the bottom of Fig. 9.

Fig. 9 is a dis-assembled view of the parts of the piston head.

Fig. 10 is an inside view of the felt packing box without packing.

Fig. 11 is a view of the spacing cup.

Fig. 12 is a face view of the bayonet slot cover.

Fig. 13 is an inside view of the leather cup washer.

The container 1 is a pump barrel externally screw threaded at its ends to receive the cap 2 and to screw into the booster head 3.

4 is the piston head comprising the felt packing box 5, felt bushing 6, spacing cup 7, bayonet slot cover 8, the leather cup washer 9, and the end plate 10.

The cap 2 is provided with an externally threaded nipple 11 having an inwardly tapering seat 12 for the tapered end 13 of the split bushing formed of two pieces 14 contained within the cap nut 15 having an internally threaded portion 16 that screws on the nipple 11 to force the bushing 14 to clamp the piston rod 17, which extends through the cap nut 15, bushing 14 and the nipple 11 into the barrel 1 and through the felt packing 6, the spacing cup 7, the bayonet slot cover 8, the leather cup washer 9 and the end plate 10, and said piston rod 17 is provided with a transverse pin 18 which projects beyond the central hole 19 of the spacing cup, and is adapted to pass through the bayonet slot 20 of the cover 8 when the piston rod 17 is turned in one direction, and to catch on said bayonet slot cover 8 when the piston rod 17 is turned to bring the pin 18 into parallelism with the slot 20, which is of sufficient length to allow the pin 18 to pass therethrough when alined therewith.

The diameters of the holes 21, 22 of the leather cup washer 9 and end cap 10 are sufficient to allow the pin to pass freely through such holes so that by turning the piston rod into the appropriate position relative to the piston head, the piston rod can be pushed through the piston head and leave the piston head free to be operated by the spring 23 in the usual manner.

The piston rod is made non-rotatable relative to the cap nut 15 so that when the piston rod is rotated it will turn the cap nut. This result is attained in the form shown, by providing the piston rod with a flat side 24 and the cap nut with a hole 25 conforming peripherally with the periphery of the piston rod so that when the piston rod is rotated by its handle 26, it will rotate the cap nut 15 in one direction to screw the cap nut onto the nipple and thereby cause the bushing 14 to be brought together to clamp the piston rod to prevent endwise reciprocation of the rod in the container; and when such rod is turned in the other direction, the cap nut will be unscrewed and release the bushing 14 from clamping position.

The bore of the cap nut is sufficiently long relative to the nipple and bushings, to allow the nut to be screwed a considerable distance onto the nipple before the bushings are forced into clamping position so that there is considerable freedom of rotation of the piston rod after the cap nut is caught on the nipple and before the bushings are brought into clamping position.

In practice the parts are assembled as shown in Fig. 2 and the piston rod rotated to bring the pin transverse to the slot 20; and the handle 26 is drawn back to compress the spring as shown in Fig. 3. The booster head 3 being unscrewed, the operator may fill the container and then screw the booster head in place. The piston rod may then be turned to loosen the clamping of the bushings 14 and may then be shoved down into position shown in Fig. 1, leaving the spring 23 free to act on the free piston head, to force grease into the booster head.

The felt washer 6 prevents the grease from being squeezed out through the packing box. The booster plunger 27 may then be operated by its handle 28 to force the grease in the cylinder 29 of the booster head out of the booster head. In case there are air pockets, not shown, in the grease in the container, and the piston head has been forced down until the pocket comes to the duct 30 in the booster head the force of the spring is not sufficient to overcome the cushion formed by the air pocket. The operator may then draw the handle 26 and the sliding piston rod out until the pin engages the bayonet slot cover 20 and then turn the handle to bring the pin into position to pass through such slot and to further turn in the chamber 31 of the piston head, so that by pushing the handle back, the piston head can be forced toward the booster head, thus positively forcing out the air when the plunger 27 is drawn back.

In this way cushioning air bubbles, not shown, may be forced out through the booster head.

32 indicates bolts which hold the end plates 10 against the cup and hold the felt packing box, the spacing cup, and the bayonet slot cover together.

I claim:

1. A grease gun comprising a container, a piston head operable in the container and a piston rod rotatable relative to the piston head and adapted to be thereby attached to and detached from the piston head; and means operable by rotating the piston rod to clamp the piston rod to the container.

2. A grease gun comprising in combination a container, a piston head in the container, a piston rod for operating the head, said piston rod being adapted to be rotated and also to be moved endwise; and clamping means operable by the rotation of the piston rod to clamp the piston rod to the container for the purpose of holding the piston head against reciprocation in the container.

3. The combination with a container and a piston rod adapted to be rotated and to be moved longitudinally in the container; a bushing and means operated by the piston rod to clamp the bushing on the piston rod.

4. The combination with a container having a threaded nipple, of a rod extending through the nipple, a nut screwed onto the nipple; said rod being slidable through the nut and non-rotatable relative thereto; and a bushing inside the nut adapted to be wedged together when the nut is screwed home, thus to clamp the bushing against the rod to prevent the rod from longitudinal movement relative to the nipple.

5. The combination with the piston head having a chamber and a piston rod having a pin adapted to be moved into and out of the chamber when the rod is in one position relative to the head and adapted to move the head when the rod is in another position relative to the piston head; a packing box cap on the piston head and packing in said packing box.

6. The combination with a piston rod of a piston head comprising an end plate, a cup washer on the end plate, a bayonet slot cover, a spacing cup, a packing box, a packing in the box, means to secure the plate, the packing box and the cup washer together, and a pin on said piston rod adapted to pass through the bayonet slot when turned to one position and to be stopped by the bayonet slot cover when turned to another position.

In testimony whereof, I have hereunto set my hand at Los Angeles, California, this 10th day of March, 1926.

WILLIAM J. MacLELLAN.